May 19, 1964 R. T. BURNETT 3,133,613
AUXILIARY PARKING BRAKE WITH AUTOMATIC ADJUSTOR
Original Filed July 7, 1955 3 Sheets-Sheet 2

INVENTOR.
RICHARD T. BURNETT
BY
Sheldon F. Raizes
ATTORNEY

May 19, 1964  R. T. BURNETT  3,133,613
AUXILIARY PARKING BRAKE WITH AUTOMATIC ADJUSTOR
Original Filed July 7, 1955  3 Sheets-Sheet 3
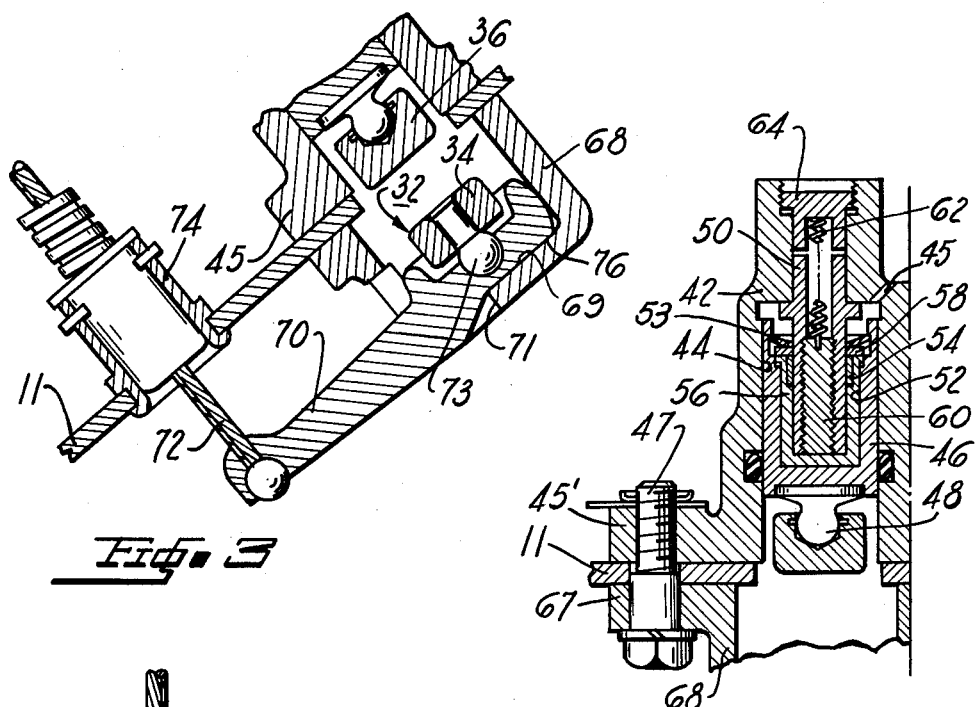
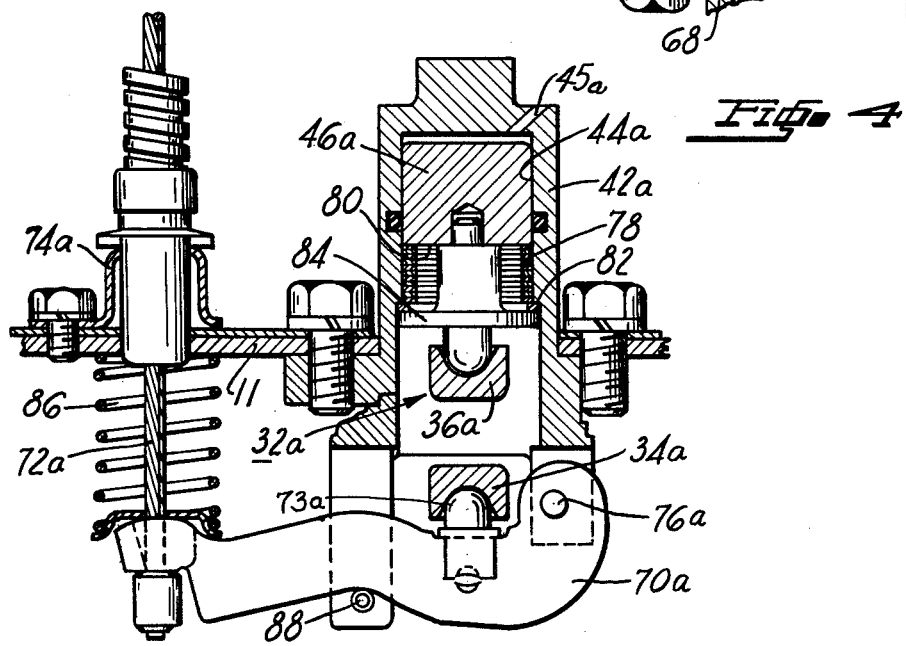
INVENTOR.
RICHARD T. BURNETT
BY
Sheldon F. Raizes
ATTORNEY

United States Patent Office 3,133,613
Patented May 19, 1964

3,133,613
AUXILIARY PARKING BRAKE WITH
AUTOMATIC ADJUSTOR
Richard T. Burnett, South Bend, Ind., assignor to The
Bendix Corporation, South Bend, Ind., a corporation
of Delaware
Continuation of application Ser. No. 521,599, July 7,
1955. This application Oct. 26, 1960, Ser. No. 65,192
4 Claims. (Cl. 188—72)

This application is a continuation in whole of my copending application Serial No. 521,599 filed July 7, 1955, which application will be abandoned without prejudice in view of its being superseded by this present application. This invention relates to a parking brake mechanism with an automatic adjustor.

It is an object of the invention to provide a mechanically operated parking brake which is incorporated into a combination "disk and shoe" type brake.

A further object of the invention is to construct a parking brake which has minimum lost motion in the applying lines, so that the friction elements can be fully applied within the limits of available travel of the applying lever.

Another object of the invention is to obtain automatic adjustment of the friction elements so that the operating characteristics of the parking brake will not change appreciably during the wear-life of the brake.

It is a further object of the invention to construct the hydraulic and manually operated portions of the brake so that each provides reaction for the other during the process of applying the brake by either means. I propose, in this manner to obtain a more compact unit, and, hence, one which is more feasible for installation in the limited space available in a vehicle wheel.

I propose to supply automatic adjustment for the friction elements by means of a simple yet reliable mechanism which easily lends itself to manufacture. Furthermore, I propose to equip the brake with automatic adjustment in order to improve operation of the manual and hydraulic devices which are used to apply the brake.

Figure 1:
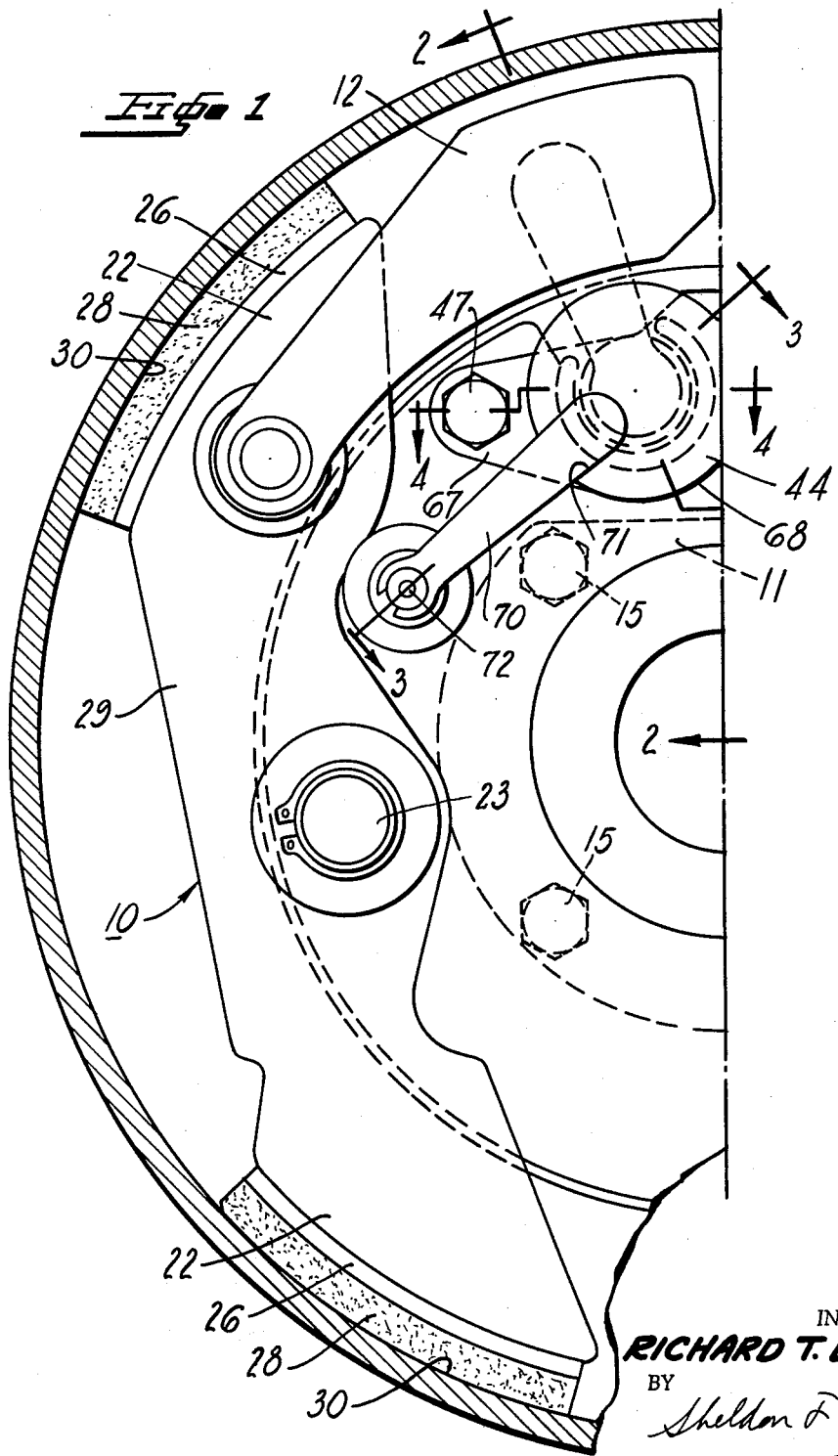
Figure 2:
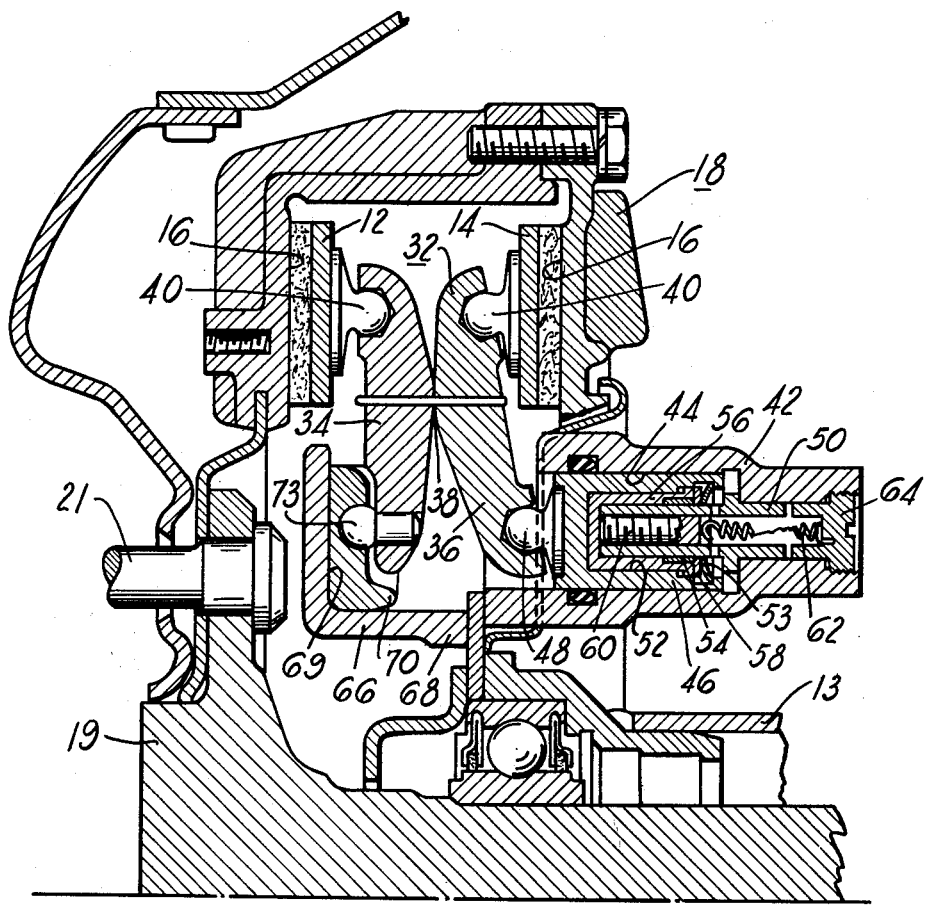

Other objects and features of the invention will become apparent from a consideration of the following description wherein reference is made to the following drawings, in which:

FIGURE 1 is the left hand side of a plan view of the brake assembly;

FIGURES 2, 3, and 4 are sectional views taken respectively on lines 2—2, 3—3, and 4—4 of FIGURE 1;

FIGURE 5 is a detail view of a second embodiment of the invention showing an applying lever and adjustor or a combination hydraulic and mechanical actuator system.

Referring to the drawings, brake unit 10 consists generally of two oppositely applied friction members 12 and 14 (FIGURE 2) which are engageable with spaced apart sides 16 of a rotor 18. The brake unit 10 is carried on a torque taking member 11, which in turn is fastened to a stationary part of the vehicle, such as an axle flange 13, by bolts 15. The rotor 18 is secured to a rotatable part of the vehicle, such as axle flange 19, by bolts 21 (FIGURE 2).

Engagement of the friction members 12 and 14 with the rotor causes the members 12 and 14 to move circumferentially, thus producing turning of the arcuate "shoe" elements 22 on anchor 23. The direction of radial movement of the "shoe" friction elements depend upon the direction of rotor movement to be impeded. Arcuate rim segments 26 having friction lining 28 are formed at opposite ends of a web 29. The friction material lining engages surface 30 of the rotor when the shoe friction elements are caused to pivot on anchor 23.

A linkage 32 (shown in FIGURE 2) consisting of articulated levers 34 and 36 is connected to friction members 12 and 14 through ball-joints 40 which permit swiveling of the linkage 32 on the friction members.

The invention is primarily concerned with means for operating the friction members 12 and 14. In providing this actuation, I employ both mechanically operated means and hydraulically operated means which will next be described.

Associated with the end of lever 36 is a fluid motor 42 consisting of a cylinder bore 44 having an inlet passage 45 (FIGURE 4) and a pressure responsive piston 46 which is slidably received in the cylinder bore 44. It will be noted that a ball-socket connection 48 is provided between the end of lever 36 and piston 46, thus permitting pivoting of the linkage 32 on the hydraulic actuator. The cylinder bore 44 is formed at the open end thereof with a flange 45' (FIGURE 4) which contacts the underside of the torque taking member 11. The flanges receive bolts 47 that attach the fluid motor to the torque taking member.

A fixed post 50 is mounted in the fluid motor and extends within a recess 52 which is formed in the piston 46. The fixed post 50 is part of an adjusting mechanism which automatically positions the piston 46 responsively to wear of the friction members 12 and 14. The automatic adjustor consists further of: a deflective washer 53, an annular member 54 frictionally gripping the outer surface of the post 50, a sleeve 56, an annular member 58 which is affixed to the sleeve, and a threaded piston-positioning element 60 which is threadedly received in post 50. A clockspring 62 is fastened at one end to the element 60, and is wound by a loading member 64 at the other end to produce a spring force, such that the member 60 tends to turn within the post 50 advancing the element 60 toward the left (FIGURE 2).

A laterally offset casting 66 is secured to the torque taking member 11 at the base 67 thereof. A cylindrical portion 68 extends from the base 67. A transverse segment 69 overlies the fluid motor and provides a fulcrum for the parking brake arrangement which will next be described.

To mechanically apply the brake, there is provided a lever 70 which extends within casting 66 through a slot 71 in the casting 66. It will be noted that a ball socket connection 73 is provided between levers 70 and 34. The brake is mechanically applied by pulling cable 72 which is received through a bushing 74 or the like and is fastened to the lever 70 (FIGURE 3). The lever 70 pivots on abutment 68 at the point 76 indicated in FIGURE 3. The applying effort of the lever 70 is exerted on the linkage 32 through the ball socket connection 73.

When the brake is applied mechanically by turning the lever 70, the reaction for this applying effort on the linkage 32 is taken by the fluid motor 42 through the piston 46. In other words, the hydraulic applying mechanism provides reaction for the mechanical applying mechanism.

In a second embodiment of the invention shown in FIGURE 5, the linkage 32a consists of articulated levers 34a and 36a which are operatively connected with friction members to spread them apart. Fluid motor 42a with inlet 45a is used to hydraulically actuate the linkage, and lever 70a is used to mechanically apply the linkage. The cable 72a is pulled to apply the lever 70a. The cable is received through a bushing or the like 74a. The lever 70a is pivoted at 76a and bears against lever 34a through a ball socket connection 73a. Piston 46a in fluid motor 42a is automatically positionable by an adjustor consisting of a plurality of stacked washers 78 which bear against a shoulder 80 formed on the piston 46a. As the lining wears, piston travel increases and successive washers spring into a new position, stacking against shoulder 82. The washers which stack against shoulder 82, thereafter limit retraction of the piston by a distance equivalent to the stacked width of the washers. It will be noted in FIGURE 5 that the adjustors stack between the shoulder 82 formed in cylinder 44a and annular boss 84 on piston 46a.

Parking brake operation is ended by releasing the cable 72a; spring 86 then rotates the lever about point 76a until it contacts a fixed pin 88.

The brake unit in FIGURE 1 is applied by developing pressure which is communicated to the fluid motor 42 (FIGURE 2) through inlet passage 45 (see FIGURE 4). Piston 46 is moved responsively to the fluid pressure, causing deflection of the curved washer 53. Initial movement of the piston 46 flattens the deflective washer 53. If piston movement should continue after the washer 53 is substantially flattened, then further piston movement causes the washer 53 to bear against member 58, with sufficient force to overcome the friction between member 54 and the outer surface of the post 50. Member 54 is thus caused to move with respect to the fixed post 50. When the sleeve 56 is moved by the piston, it disengages from the piston-positioning member 60, thereby permitting the coil springs 62 to rotate the piston-positioning member 60, thus advancing it with respect to the fixed post 50 to follow up movement of the sleeve 56. The piston-positioning member 60 thus remains in contact with the sleeve through the rotary movement produced by spring 62.

The piston 46 applies the friction members 12 and 14 through connection 48 on the lever 36 of linkage 32. The linkage 32 pushes against abutment 68 when the brake is hydraulically applied (FIGURE 2). The links 34 and 36 rock at point 38 and bear against the ball socket joints 40 to spread the friction members 12 and 14 against sides 16 of the rotor. When the brake is released, the flattened washer 53 tends to resume its original position and thus retracts the piston until it re-contacts sleeve 56 which serves to limit the extent of retraction of the piston 46.

When the brake is mechanically actuated, the operator exerts applying effort through the cable 72 which transmits the applying force to lever 70. The lever 70 fulcrums on portion 68 and bears against lever 34 through the ball joint connection 73. The linkage 32 pushes against piston 46 when the brake is mechanically applied (FIGURE 2). The reaction force is too great to be resisted by the frictional force between member 54 and the outer surface of the post 50; and, therefore, further resistance is supplied by contact of piston-positioning member 60 with piston 46 through the sleeve 56.

When the lever 70 is operated, the linkage 32 rocks at point 38 and exerts applying effort on the friction members 12 and 14 through the ball socket connections 40 just as in hydraulic application of the brake. It will be noted that the adjuster which is located in association with the fluid motor also serves as an automatic adjustor for the parking brake mechanism. It is highly important to obtain adjustment of the friction members since there is only limited travel of the applying lever which is available to the operator. Oftentimes the available lever travel is exhausted before the brake is fully applied unless the brakes are adjusted.

It will be noted that linkage losses in this invention are reduced to a minimum, both because of the automatic adjustment and also because of the particular inlet location of the cable. The cable 72 extends directly into the brake system and is then fastened to the end of the applying lever. Since there is no bending of the cable there are no appreciable friction losses which accompany turning or bending of the applying cable.

It will be further appreciated that the mechanical applying device is located between one lever of the applying linkage 32 and a fixed portion 68 which provides reaction for the hydraulic application of the brake (FIGURE 2). By so locating the mechanical applying means, it is possible to limit the axial dimensioning of the brake and also incorporate a parking brake mechanism for axially-applied friction members.

The operation of the embodiment in FIGURE 5 is as follows:

Fluid pressure is communicated to the hydraulic motor whereupon piston 46a is caused to move responsively thereto. Initial movement of the piston 46a causes the lowermost washer to approach the shoulder 82, and if piston movement 46a is sufficiently great, the lowermost washer will follow up and spring outwardly over shoulder 82 so that when hydraulic pressure is relieved, retractile movement of the piston is limited by engagement of boss 84 with the washer which has moved into contact with the shoulder 82. It will be seen that stacking of successive washers against shoulder 82 has the effect of displacing piston 46a since the boss 84 is moved farther away from the shoulder 82 by increments of the cumulative thicknesses of respective washers.

Reaction for the linkage when the brake is hydraulically applied, is supplied by the lever 70a which is fixed by pins 76a and 88.

When the brake is mechanically applied, the operator pulls on cable 72a and the lever 70a is pivoted at 76a, thereby exerting effort on lever 34a of the linkage and thereby producing spreading of the friction members. Reaction for the linkage when the brake is mechanically applied, is supplied by the fluid motor; specifically, contact through the boss 84 directly with the shoulder 82 or through the adjusting washers 78 on the shoulder 82. When the applying effort on the cable 72 is released, the lever 70a is pivoted to a retracted position by the spring 86 which moves the lever until it contacts stop 88.

It will be noted that the benefits of automatic adjustment are not only obtained in the hydraulic applying system but also during parking brake operation when the brake is mechanically operated.

Although the invention has been described and explained with only two selected embodiments, it will be understood by those skilled in the art that various changes in design and location of parts may be made without departing from the underlying principles of the invention. I intend therefore to include within the scope of the following claims all equivalent structure for obtaining the same or substantially equivalent results.

I claim:

1. In a brake, a pair of oppositely applied friction members having substantially flat friction surfaces, an applying linkage, means for hydraulically actuating said linkage to apply said friction members, means pivotally connecting said linkage through its ends with said pair of friction members and also to said hydraulically actuating means to provide for both pivotal and swivable movement of said linkage, said hydraulic actuating means being inclusive of a cylinder, and a pressure responsive element slidably received in said cylinder and movable therein to exert effort on one portion of said linkage which is thereby actuated to apply said members, a fixed member limiting retractile movement of said pressure responsive element, means for automatically positioning said pressure responsive member on said fixed member to adjust said friction members, a reaction member against which said linkage is thrust during protractile movement of said pressure responsive element, and mechanically operable means for actuating said linkage, said mechanically operable means consisting of a turnable lever fulcrumed on said reaction member and acting through said pivotal connecting means to exert actuating effort on said linkage which bears against the pressure responsive element contacting said fixed member.

2. In a brake, two friction members which are forced apart to apply the brake, linkage means comprising two levers operatively connected to each other intermediate their ends, means rockably connecting one end of each of said levers to a respective friction member, fluid operated means comprising a fluid motor having a pressure responsive element movable therein, said fluid motor having fixed stop means for limiting retraction of said pressure responsive element, means rockably connecting the other end of one of said levers to said pressure responsive element, means providing reaction for said linkage as said hydraulic means is operated to apply the brake, mechanically operated means, said mechanically operated means comprising a lever operatively connected to the other of said levers, a fulcrum on said reaction means for said mechanically operated lever, said stop means providing a reaction for said linkage upon mechanical operation.

3. In a brake, two friction members which are forced apart to apply the brake, linkage means comprising two levers operatively connected to each other intermediate their ends, means rockably connecting one end of each of said levers to a respective friction member, fluid operated means comprising a fluid motor having a pressure responsive element movable therein, said fluid motor having fixed stop means for limiting retraction of said pressure responsive element, means rockably connecting the other end of one of said levers to said pressure responsive element, support means, mechanically operated means comprising a lever interposed between said support means and the other end of the other of said levers, means rockably connecting said mechanically operated lever to said other end of said other lever, a fulcrum on said support means for said mechanically operated lever, whereby upon operation of said pressure responsive element, said linkage reacts on said support means and upon actuation of said mechanically operated lever, said linkage reacts on said stop means.

4. The structure as recited in claim 2 further including means automatically adjusting the retracted position of said pressure responsive element to compensate for wear of said friction members.

References Cited in the file of this patent
UNITED STATES PATENTS

| | | |
|---|---|---|
| 1,927,358 | Breguet | Sept. 19, 1933 |
| 2,174,398 | Farmer | Sept. 26, 1939 |
| 2,372,319 | Francois | Mar. 27, 1945 |
| 2,568,858 | Kovac | Sept. 25, 1951 |
| 2,569,012 | Lauer | Sept. 25, 1951 |
| 2,633,941 | Zindler | Apr. 7, 1953 |
| 2,781,106 | Lucien | Feb. 12, 1957 |
| 2,873,006 | Phillips | Feb. 10, 1959 |